United States Patent
Boller et al.

(10) Patent No.: US 8,924,403 B2
(45) Date of Patent: Dec. 30, 2014

(54) METHOD AND SYSTEM FOR CENTRAL DATA QUERYING

(75) Inventors: Stefan Boller, Heidelberg (DE); Sigo Henkel, Heidelberg (DE); Ramprasad S, Bangalore (IN); Paresh Deshpande, Bangalore (IN)

(73) Assignee: SAP SE, Walldorf (DE)

( * ) Notice: Subject to any disclaimer, the term of this patent is extended or adjusted under 35 U.S.C. 154(b) by 1801 days.

(21) Appl. No.: 11/967,285

(22) Filed: Dec. 31, 2007

(65) Prior Publication Data
US 2009/0171940 A1 Jul. 2, 2009

(51) Int. Cl.
*G06F 17/30* (2006.01)
(52) U.S. Cl.
CPC .............. *G06F 17/30389* (2013.01)
USPC ............ 707/758; 707/765; 707/768; 707/769
(58) Field of Classification Search
USPC .................. 707/758, 765, 768, 769
See application file for complete search history.

(56) References Cited

U.S. PATENT DOCUMENTS

| | | | | |
|---|---|---|---|---|
| 5,920,872 A * | 7/1999 | Grewell et al. | ...... | 1/1 |
| 6,363,396 B1 * | 3/2002 | Klots et al. | ...... | 1/1 |
| 7,080,075 B1 * | 7/2006 | Chan et al. | ...... | 1/1 |
| 7,444,319 B1 * | 10/2008 | Sathyanarayan | ...... | 707/3 |
| 7,506,048 B1 * | 3/2009 | Motoyama | ...... | 709/224 |
| 2003/0177111 A1 * | 9/2003 | Egendorf et al. | ...... | 707/3 |
| 2008/0005268 A1 * | 1/2008 | Chen | ...... | 709/217 |
| 2009/0006405 A1 * | 1/2009 | Detlefs et al. | ...... | 707/8 |
| 2009/0125499 A1 * | 5/2009 | Cross et al. | ...... | 707/5 |
| 2009/0144265 A1 * | 6/2009 | Modzelewski | ...... | 707/5 |

* cited by examiner

*Primary Examiner* — Pierre Vital
*Assistant Examiner* — Andalib Lodhi

(57) ABSTRACT

A method and system for central data querying are provided. A user parameter requesting data is retrieved. A device is determined based upon the user parameter. A query is generated based upon the user parameter. The query is executed in the device to extract the data.

17 Claims, 4 Drawing Sheets

METHOD AND SYSTEM FOR CENTRAL DATA QUERYING

TECHNICAL FIELD

Embodiments of the invention generally relate to computer systems, and more particularly to a method and system for central data querying.

BACKGROUND

Several middleware components exist in a heterogeneous system landscape to simplify data exchange between business systems. Each of the middleware components facilitates data exchange between the business systems and stores data during data exchange operations. A set of middleware components are typically integrated by an integration server that usually defines the communication protocol between the middleware components that the integration server integrates. A system landscape may have several sets of middleware components, each set of middleware components being integrated by an integration server. Frequently a user must search for data stored in one or more of the middleware components.

The current systems allow a user to search for the data in one or more of the middleware components by providing one or more search parameters along with an exact address of the middleware components where the data exists. The address may include an address of a set of middleware components, an address of a middleware component that is a part of the set of middleware components, an address of an integration server managing the middleware component and the like.

Thus the user must have knowledge of the middleware component where the data is located. No system exists that may take a search parameter from the user, intelligently identify the middleware component where the data is located and retrieve the data automatically.

SUMMARY OF THE INVENTION

Embodiments of the invention are generally directed to a method and system for central data querying. A user parameter requesting data is retrieved. A device is determined based upon the user parameter. A query is generated based upon the user parameter. The query is executed in the device to extract the data.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for central data querying. A user parameter requesting data is retrieved. A device is determined based upon the user parameter. A query is generated based upon the user parameter. The query is executed in the device to extract the data.

Figure 1:
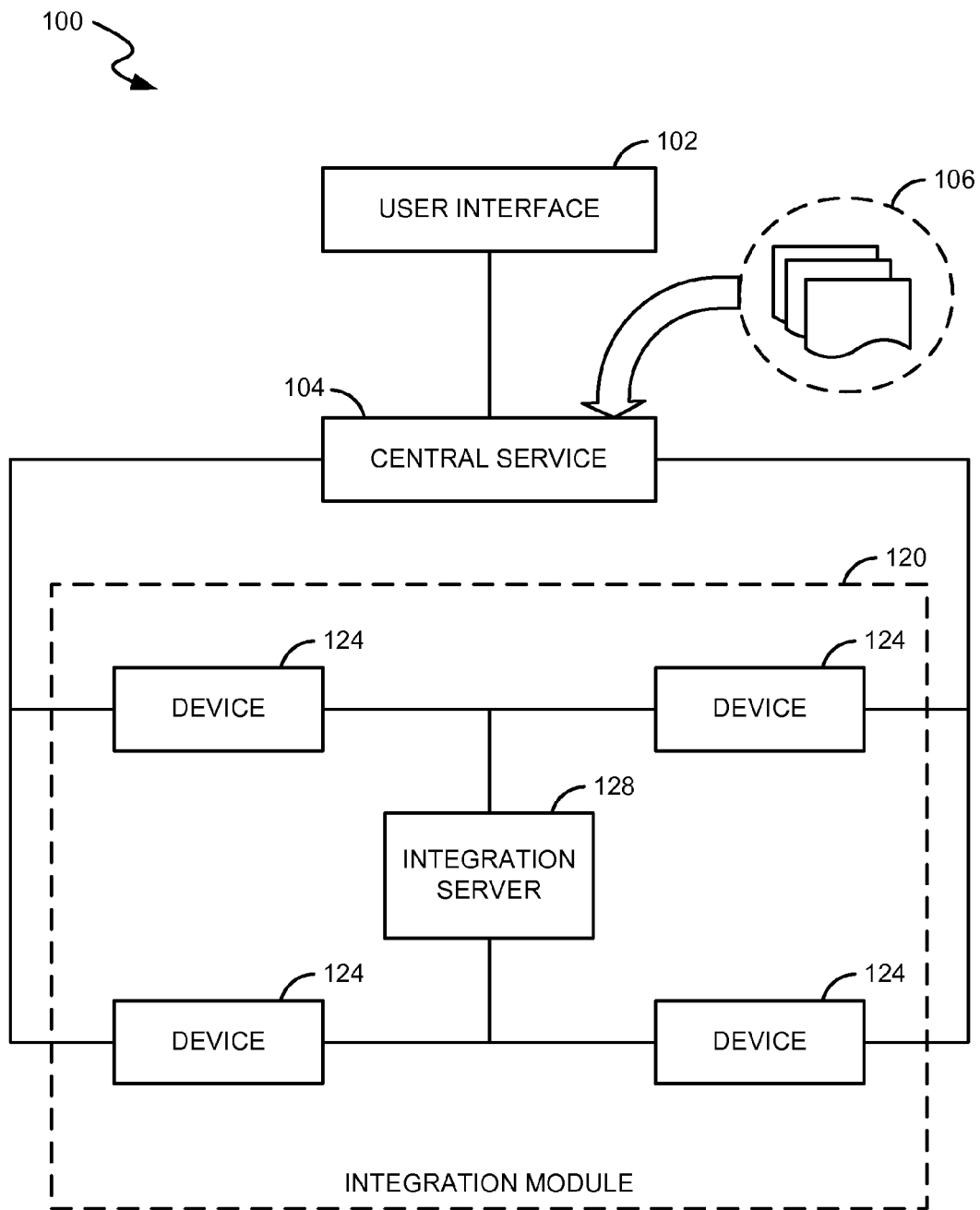
FIG. 1 is a functional block diagram of a system for central data querying according to an embodiment of the invention.

FIG. 1 is a functional block diagram of a system 100 for central data querying according to an embodiment of the invention. Integration module 120 typically includes one or more devices 124 storing similar nature of data. Devices 124 are generally managed by integration server 128. Integration server 128 defines the communication protocol that must be followed for communication amongst devices 124. According to an embodiment, integration server 128 defines the communication protocol that must be followed for communication between devices 124 and central service 104.

A system landscape typically consists of one or more integration modules 120 with each integration module having one or more devices 124. Each integration module 120 may include one or more integration servers 128 managing devices 124. According to an embodiment, devices 124 include middleware components that facilitate exchange of data between devices 124 or exchange of data across devices 124 of various integration modules 120. Each device 124 typically stores data. The data may include messages generated during data exchange operations, configuration data, data useful for analysis and the like.

User interface 102 typically enables a user to search and retrieve the data stored in devices 124. User interface 102 may provide the user with means to specify one or more search parameters based upon which the user may want to conduct a search. The means may include a drop down menu option, an input field, a list of check box menus and the like. The user typically raises a search request by specifying the search parameters.

Central service 104 generally receives the search request and generates a query. According to an embodiment the query is a general purpose database query. The query typically includes an input parameter node and a result node. The input parameter node typically stores the search parameters provided by the user as input parameters. A search is usually conducted by the query based upon the input parameters. The result node typically stores the data retrieved by the query as a result of the search. Generating the query usually includes passing the search parameters provided by the user as input parameters to the query. Based upon the search parameters provided by the user, central service 104 determines the address of one or more devices 124 that are most likely to store the requested data. According to an embodiment, determining the address of one or more devices 124 includes determining the address of integration module 120 having devices 124 and the address of integration server 128 managing devices 124. Central service 104 generally refers to landscape directory 106 to determine the address of devices 124. Landscape directory 106 generally maintains a table storing device identifiers uniquely identifying devices 124, the address of each device 124 in the system landscape and the nature of data stored by devices 124. Based upon the search parameters provided by the user, central service 104 determines a nature of data requested by the user. Central service 104 searches landscape directory 106 for the addresses of one or more devices 124 based upon the nature of the data requested by the user. Central service 104 retrieves the device identifiers and addresses of devices 124 from landscape directory 106 that store a similar nature of data as requested by the user.

Based upon the addresses of devices 124 retrieved from landscape directory 106, central service 104 forwards the query to each device 124 at the determined addresses. According to an embodiment the address may include the address of integration module 120 having devices 124 and the address of integration server 128 managing devices 124. The query may be forwarded to each device 124 in parallel or in a sequence. According to an embodiment the query is forwarded from central service 104 to the devices 124 using a one or more web services.

Upon receiving the query from central service 104, each device 124 executes the query. Executing the query typically includes searching the database stored in device 124 based upon the input parameters stored in the input parameter node of the query and extracting required data as a result of the search. The result of the search is typically stored in the result node of the query. The result from one or more devices 124 is then communicated back to central service 104. According to an embodiment the query after storing the result of the search in the result node is communicated back to central service 104. Central service 104 may extract the required data from the result node of the query. Finally, Central service 104 forwards the data requested by the user to user interface 102. User interface 102 may display the data in a required format.

Figure 2:
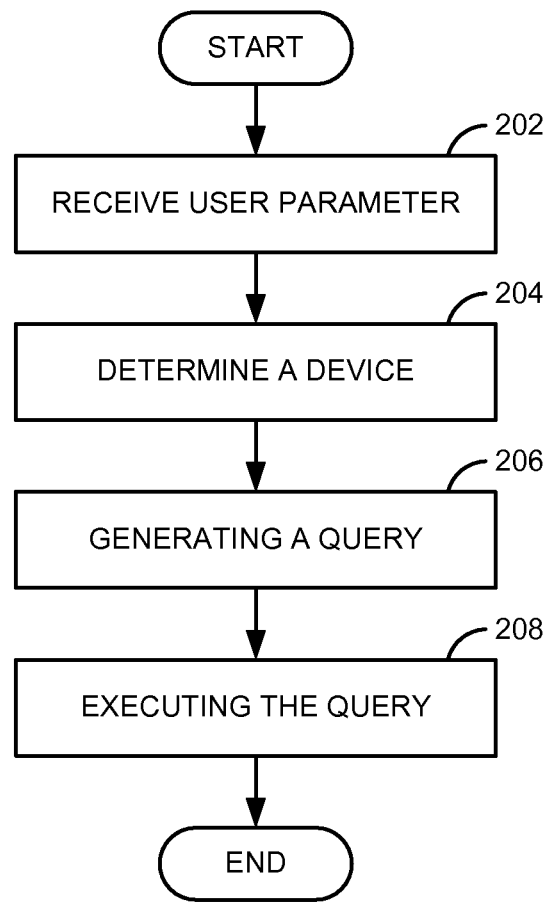
FIG. 2 is a flow diagram of a process for central data querying according to an embodiment of the invention.

FIG. 2 is a flow diagram of a process for central data querying according to an embodiment of the invention. In process block 202, a user parameter is received typically from a user interface. The user parameter typically includes one or more search parameters based upon which a user wants to conduct a search for data. In process block 204, a device is determined based upon the search parameters provided by the user. Determining the device includes determining an address of the device that is most likely to store the data requested by the user. In process block 206, a query is generated for search of data requested by the user based upon the search parameters. In process block 208, the query is executed in the device to extract the data requested by the user.

Figure 3:
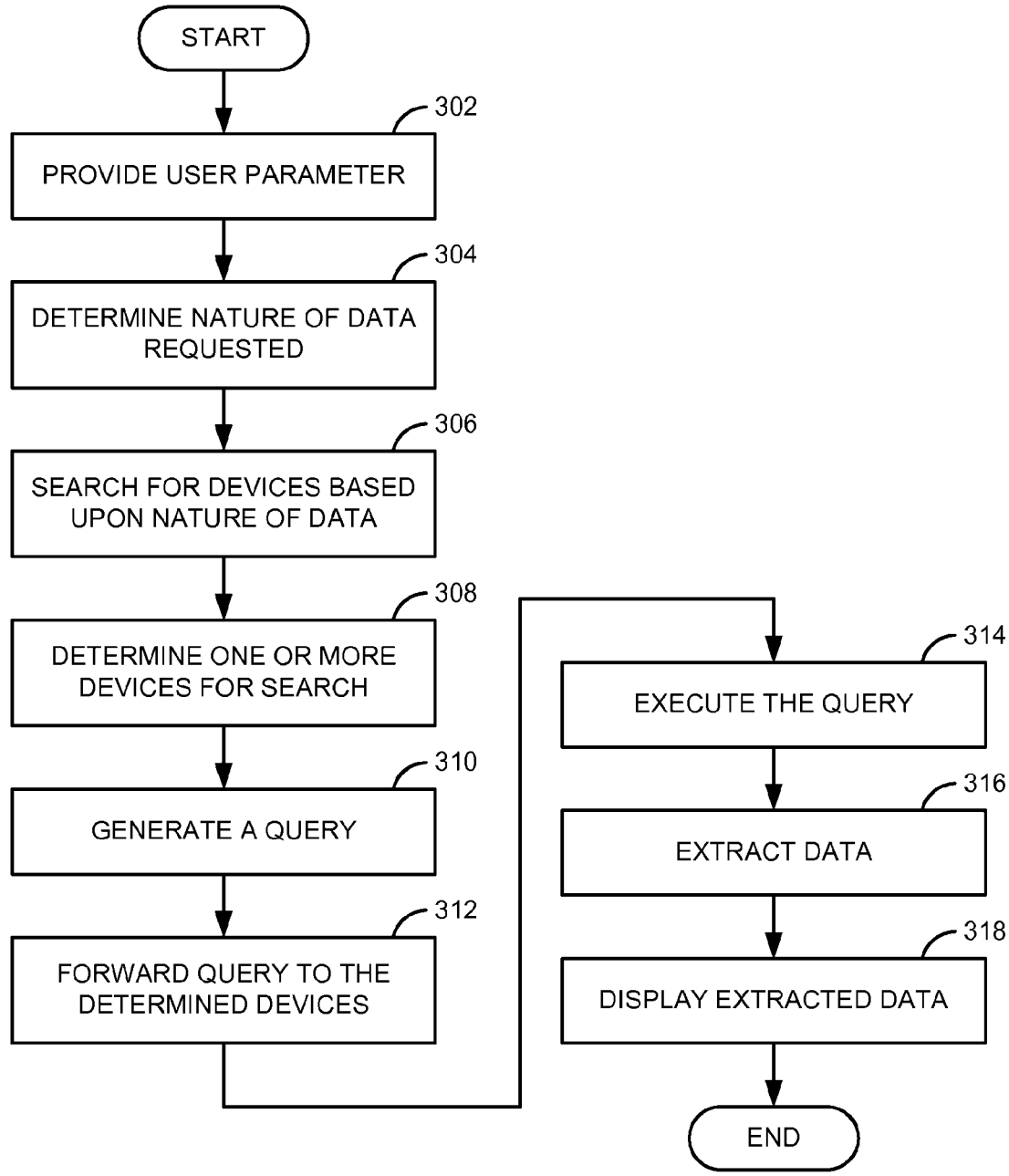
FIG. 3 is a flow diagram of a process for central data querying according to an embodiment of the invention.

FIG. 3 is a flow diagram of a process for central data querying according to an embodiment of the invention. In process block 302 one or more user parameters are provided by a user to request data stored by one or more devices. The user parameters typically include search parameters based upon which the user wants to conduct a search for the requested data. In process block 304, a nature of the data requested by the user is determined based upon the user parameters provided by the user. In process block 306, a search for the devices most likely to store the requested data is conducted based upon the nature of the requested data. The search is usually conducted in a landscape directory storing the device identifiers, the addresses of the devices and the nature of data stored by each of the devices. In process block 308, one or more devices storing similar nature of data as requested by the user is determined as a result of the search conducted in the landscape directory. Determining the devices includes extracting the addresses of the devices, the address of an integration module having the devices and the address of an integration server managing the devices from the landscape directory. In process block 310, a query is generated for searching the devices for requested data. Generating the query typically includes passing the search parameters provided by the user as input parameters to an input parameter node of the query. In process block 312, the query is forwarded to each of the determined devices at the addresses extracted from the landscape directory. In process block 314, the query is executed by each of the devices. The execution typically includes conducting a search for the requested data based upon the input parameters stored in the input parameter node of the query. In process block, 316, the requested data is extracted from each of the devices based upon the search. The extracted data is typically stored in the result node of the query. In process block 318, the extracted data is displayed to the user in a required format.

Figure 4:
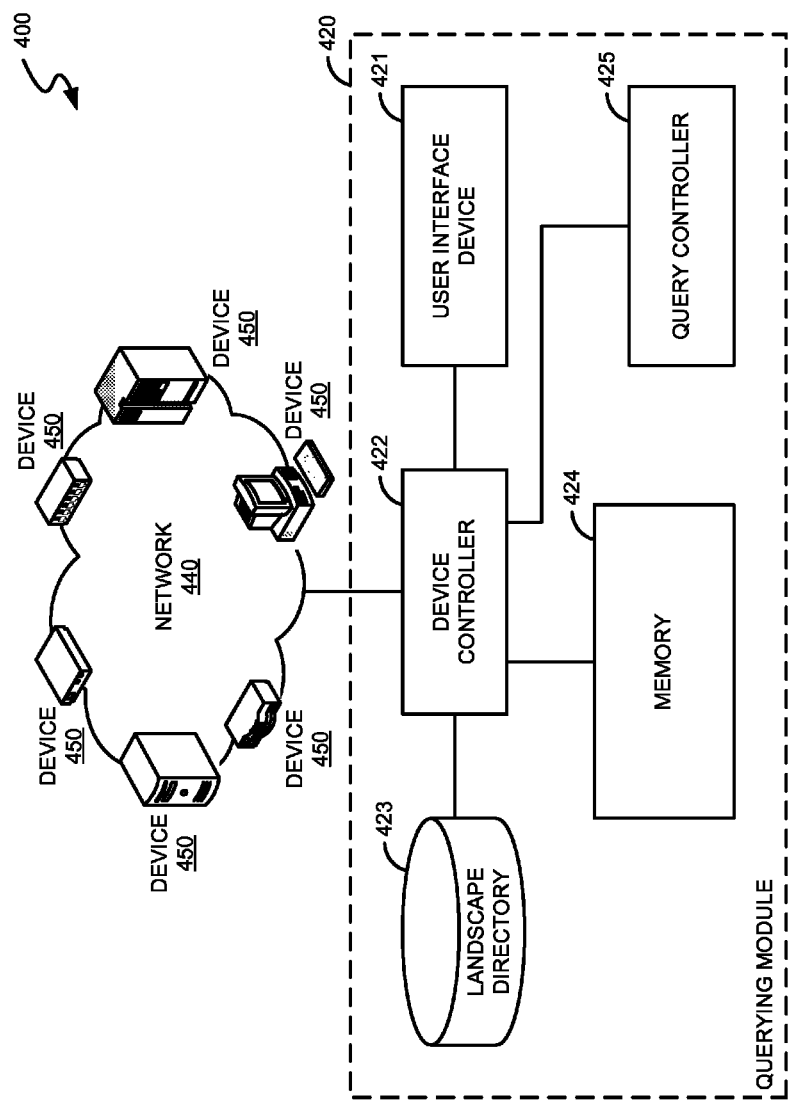
FIG. 4 is a block diagram of a system for central data querying useful for implementing the invention according to an embodiment of the invention.

FIG. 4 is a block diagram of a system 400 for central data querying useful for implementing the invention according to an embodiment of the invention. Query module 420 is responsible for receiving data requests from users and retrieving the requested data from one or more devices. Query module 420 includes user interface device 421, device controller 422, landscape directory 423, memory 424 and query controller 425. Device controller 422 is connected to landscape directory 423, memory 424, user interface device 421 and query controller 425. In addition memory 424 is connected to query controller 425. Devices 450 are connected to device controller 422 through network 440. According to an embodiment one or more devices 450 may comprise integration servers. The integration servers typically manage a group of devices 450. The integration server generally defines the communication protocol that must be followed by for communication amongst devices 450. According to an embodiment, the integration server defines the communication protocol that must be followed for communication between devices 450 and device controller 422.

System 400 typically includes one or more integration modules with each integration module having one or more devices 450. An integration module is typically a logical module that groups one or more devices performing similar functions and store similar nature of data. Each integration module may include one or more integration servers managing devices 450. According to an embodiment, one or more devices 450 are middleware components that facilitate exchange of data between devices 450 or exchange of data across devices 450 of various integration modules. Each device 450 typically stores data. The data may include messages generated during data exchange operations, configuration data, data useful for analysis and the like.

User interface device 421 typically enables a user to search and retrieve the data stored in devices 450. User interface device 421 may provide the user with means to specify one or more user parameters based upon which the user may like to conduct a search. The user parameters typically include one or more search parameters. The means may include a drop down menu option, an input field, a list of check box menus and the like. The user typically raises a search request by specifying the search parameters. The user parameters are typically received and stored by memory 424.

Query controller 425 generally receives the search request from user interface device 421 and generates a query based upon the user parameters provided by the user. Query controller 425 may generate the query from the user parameters stored in memory 424. According to an embodiment the query is a general purpose database query. The query typically includes an input parameter node and a result node. The input parameter node typically stores the search parameters provided by the user as input parameters. A search is usually conducted by the query based upon the input parameters. The result node typically stores the data retrieved by the query as a result of the search. Building the query usually includes passing the search parameters provided by the user as input parameters to the query. Based upon the search parameters provided by the user, device controller 422 determines the address of one or more devices 450 that are most likely to store the requested data. According to an embodiment, determining the address of one or more devices 450 includes determining the address of the integration module having devices 450 and the address of the integration server managing devices 450. Device controller 422 generally refers to landscape directory 423 to determine the address of devices 450. Landscape directory 423 generally maintains a table storing device identifiers uniquely identifying devices 450, the address of each device 450 and the nature of data stored by devices 450. Based upon the search parameters provided by the user, device controller 422 determines a nature of data requested by the user. Device controller 422 searches landscape directory 423 for the addresses of one or more devices 450 based upon the nature of the data requested by the user. Device controller 422 retrieves the device identifiers and addresses of devices 450 from landscape directory 423 that store a similar nature of data as requested by the user.

Based upon the addresses of devices 450 retrieved from landscape directory 423, device controller 422 forwards the query to each device 450 at the determined addresses. According to an embodiment the address may include the address of the integration module having devices 450 and the address of the integration server managing devices 450. The query may be forwarded to each device 450 in parallel or in a sequence.

Upon receiving the query from device controller 422, each device 450 executes the query. Executing the query typically includes searching the database stored in device 450 based upon the input parameters stored in the input parameter node of the query and extracting required data as a result of the search. The result of the search is typically stored in the result node of the query. The result from one or more devices 450 is then communicated back to device controller 422. According to an embodiment the query after storing the result of the search in the result node is communicated back to device controller 422. Device controller 422 may extract the required data from the result node of the query. Finally, device controller 422 forwards the data requested by the user to user interface device 421. User interface device 421 may display the data in a required format.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

What is claimed is:

1. A method comprising:
    receiving a user parameter requesting data;
    determining a device from a plurality of devices in a system landscape based upon the user parameter for requesting the data from the device, wherein determining the device includes extracting addresses of the device, of an integration module having the device and of an integration server managing the device from a system landscape directory;
    passing the user parameter as an input parameter to a general purpose database query; and
    conducting a search by the query at the device to extract the data based on the input parameter.

2. The method of claim 1, wherein determining a device comprises:
    determining a nature of the data based upon the user parameter; and
    searching the system landscape directory based upon the nature of data, the system landscape directory maintaining information for the plurality of devices in the system landscape, the integration module having the device and the integration server managing the device.

3. The method of claim 2, wherein the information is selected from a grouping consisting of a device identifier, a device address and the nature of the data stored by the device.

4. The method of claim 1, wherein conducting the search comprises:
    receiving a result from a database search based upon the user parameter stored in an input parameter node of the query, wherein the result is stored in a result node of the query; and
    extracting the data from the result node of the query in a required format.

5. The method of claim 1, further comprising:
    determining a second device from the plurality of devices in the system landscape based upon the user parameter for requesting the data from the second device; and
    conducting a parallel search by the query at the second device to extract the data based upon the input parameter.

6. The method of claim 1, wherein the device is a middleware component.

7. The method of claim 1, further comprising communicating the query to the device using a web service.

8. A system comprising:
    a memory to store program code; and
    a processor coupled to the memory to execute the program code to receive a user parameter requesting data;
        determine a device from a plurality of devices in a system landscape based upon the user parameter for requesting the data from the device, wherein determining the device includes extracting addresses of the device, of an integration module having the device and of an integration server managing the device from a system landscape directory;

pass the user parameter as an input parameter to a general purpose database query; and trigger a search by the query at the device to extract the data based on the input parameter.

9. The system of claim 8 further comprising a network connecting the device and the processor.

10. The system of claim 8, wherein the device comprises a middleware component.

11. A machine-accessible medium that provides instructions that, when executed by a machine, cause the machine to perform operations comprising:

receiving a user parameter requesting data;

determining a device from a plurality of devices in a system landscape based upon the user parameter for requesting the data from the device, wherein determining the device includes extracting addresses of the device, of an integration module having the device and of an integration server managing the device from a system landscape directory;

passing the user parameter as an input parameter to a general purpose database query; and triggering a search with the query at the device to extract the data based on the input parameter.

12. The machine-accessible medium of claim 11, wherein determining a device comprises:

determining a nature of the data based upon the user parameter; and searching the system landscape directory based upon the nature of data, the system landscape directory maintaining information for the plurality of devices in the system landscape, the integration module having the device and the integration server managing the device.

13. The machine-accessible medium of claim 12, wherein the information is selected from a grouping consisting of a device identifier, a device address and the nature of the data stored by the device.

14. The machine-accessible medium of claim 11, wherein triggering the search comprises:

receiving a result from a database search based upon the user parameter stored in an input parameter node of the query, wherein the result is stored in a result node of the query; and extracting the data from the result node of the query in a required format.

15. The machine-accessible medium of claim 11 further providing instructions that, when executed by a machine, cause the machine to perform further operations comprising:

determining a second device from the plurality of devices in the system landscape based upon the user parameter for requesting the data from the second device; and triggering a search with the query at the second device to extract the data based upon the input parameter.

16. The machine-accessible medium of claim 11, wherein the device is a middleware component.

17. The machine-accessible medium of claim 11 further providing instructions which when executed by the machine cause the machine to perform further operations comprising communicating the query to the device using a web service.

* * * * *